United States Patent [19]

Sprenger

[11] 3,903,132
[45] Sept. 2, 1975

[54] 2-(2-CYANO-2-ARYLETHENYLPHENOXY)-2,2-DIMETHYL ACETIC ACIDS AND ESTERS

[75] Inventor: William K. Sprenger, Arlington Heights, Ill.

[73] Assignee: G. D. Searle & Co., Chicago, Ill.

[22] Filed: Aug. 8, 1974

[21] Appl. No.: 495,858

[52] U.S. Cl. ............................. 260/465 D; 260/999
[51] Int. Cl.² ...................................... C07C 121/70
[58] Field of Search ................................ 260/465 D

[56] References Cited
UNITED STATES PATENTS
3,636,073   1/1972   Cragoe, Jr. et al. ............ 260/465 D Primary Examiner—Elbert L. Roberts
Assistant Examiner—Dolph H. Torrence
Attorney, Agent, or Firm—John J. McDonnell

[57] ABSTRACT

This invention is concerned with compounds of the formula

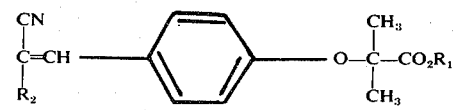

wherein $R_1$ is hydrogen or lower alkyl and $R_2$ is phenyl, halophenyl, trifluoromethylphenyl, p-[2-(lower alkoxy)carbonyl-2-oxypropyl]phenyl or 3,4,5-tri-(lower alkoxy)=phenyl. The compounds of this invention are prepared by the condensation of ethyl (4-formylphenoxy)-2,2-dimethylacetate with an appropriate substituted phenyl=acetonitrile. The compounds of the present invention are useful as hypolipemic agents.

14 Claims, No Drawings

2-(2-CYANO-2-ARYLETHENYLPHENOXY)-2,2-DIMETHYL ACETIC ACIDS AND ESTERS

The present invention is concerned with compounds of the formula

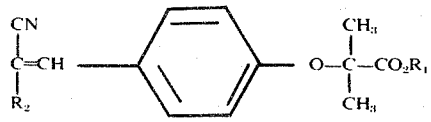

wherein $R_1$ is hydrogen or lower alkyl and $R_2$ is phenyl, halophenyl, trifluoromethylphenyl, p-[2-(lower alkoxy) carbonyl-2-oxypropyl]phenyl or 3,4,5-(tri-lower alkoxy)phenyl. Lower alkyl refers to alkyl groups having 1–7 carbon atoms such as methyl, ethyl, propyl, isopropyl, butyl, pentyl, hexyl, and heptyl with methyl and ethyl being preferred lower alkyls.

The compounds of the present invention are structurally distinct from compounds known in the most closely related art. For example, U.S. Pat. No. 3,558,612 describes 4-(arylcarbonylalkenyl)phenoxyacetic acid derivatives. The compounds of the present invention are particularly distinct from the compounds in the U.S. Pat. No. 3,558,612 in that ethenyl radical is substituted wity cyano and phenyl in the present invention instead of benzoyl and in that the compounds in the present invention are derivatives of dimethylacetic acid instead of acetic acid.

The compounds of the present invention are also structurally distinct from the compounds disclosed in U.S. Pat. No. 3,636,073 in that the former are limited to cyano- and phenyl-substituted ethenyl while the latter compounds have the following structure

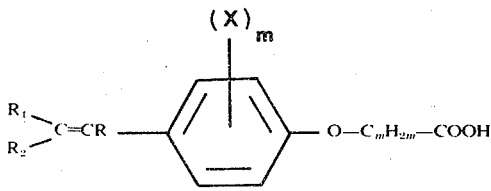

wherein $R$ is hydrogen or alkyl, for example, lower alkyl such as methyl, ethyl, propyl, etc; $R_1$ is hydrogen, lower alkanoyl such as acetyl, propionyl, etc., cyano, carboxy, alkoxycarbonyl, for example, lower alkoxycarbonyl, methoxycarbonyl, ethoxycarbonyl, etc., sulfamoyl, carbamoyl, alkylsulfonyl, for example, lower alkylsulfonyl such as methanesulfonyl, ethanesulfonyl, etc. or mononuclear arylsulfonyl such as benzenesulfonyl, etc; $R_2$ is cyano, alkoxycarbonyl, for example, lower alkoxycarbonyl such as methoxycarbonyl, ethoxycarbonyl, $X$ is halo and $m$ is 2. The present compounds thus have different substitution on the ethenyl and the phenoxy moieties.

The compounds of the present invention are prepared as shown in Scheme I.

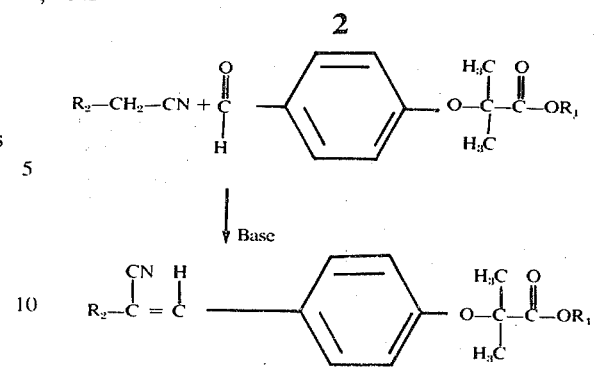

Scheme I

The condensation of an appropriate substituted phenylacetonitrile with ethyl 4-(formylphenyl)-2,2-dimethylacetate in an alcoholic base such as an alkali metal alkoxide in alcohol, e.g. sodium ethoxide in ethanol, provides the desired product. Thus, 9.4 parts of ethyl (4-formylphenoxy)-2,2-dimethylacetate and 4.7 parts of phenylacetonitrile in 10 parts by volume of ethanol containing .01 part of sodium metal are reacted for 2 hours. This reaction mixture is quenched with 100 parts of cold water and extracted with ether. The ether extracts are dried over magnesium sulfate. Filtration of the magnesium sulfate, removal of the ether by evaporation at reduced pressure and column chromatography on silica gel provides ethyl 2-[4-(2-cyano-2-phenylethenyl)phenoxy]-2,2-dimethylacetate, melting at 70°–71°C.

The hypolipemic utility of the instant compounds can also be demonstrated by the following standardized test for their capacity to lower both serum cholesterol and serum triglycerides in rats. Charles River CD rats weighing 400–450 gm. apiece and maintained on tap water ad libitum are used in this test. To each of a group (Group I) of 8 such animals is administered in the powdered diet 0.2% of compound. The compound is incorporated by dissolving it in acetone or other volatile solvent and mixing the solution with the diet, whereupon the solvent is allowed to evaporate at room temperatures. The animals are fed the treated diet for 5 days. On the 6th day serum samples are obtained and are analyzed for cholesterol and triglycerides. Cholesterol is analyzed by the method of Block et al., Automation in Analytical Chemistry, Technicon Symposium, 1965, Mediad Incorporated, White Plains, N.Y. 10601, pp. 345 ff.; and the triglycerides are assayed by the procedure of Noble and Campbell, Clin. Chem., 16, 166 (1970). Controls are provided by a second group (Group II) of 8 animals each concurrently and identically treated except that in Group II the compound is omitted from the diet. A compound is considered hypolipemic if the mean mg.%-serum cholesterol and triglyceride values for Group I are significantly lower than for Group II. The level of significance in each instance is $P < 0.05$ as determined by the Wilcoxon Rank Sum method.

The following examples are illustrations of the present invention and are not intended to limit the scope of the invention.

EXAMPLE 1

9.4 Parts of ethyl (4-formylphenoxy)-2,2-dimethylacetate and 4.7 parts of phenylacetonitrile in 10 parts by volume of ethanol containing .01 part of sodium metal are reacted for 2 hours. This reaction mixire is quenched with 100 parts of cold water and extracted with ether. The ether extracts are dried over magnesium sulfate. Filtration of the magnesium sulfate, removal of the ether by evaporation at reduced pressure and column chromatography on silica gel provides hyl 2-[4-(2-cyano-2-phenylethenyl)phenoxy]-2,2-methylacetate, melting at 70°–71°C. This compound is the following structural formula.

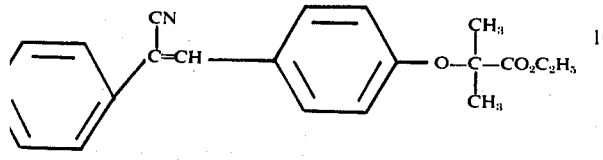

EXAMPLE 2

Following the procedure in Example 1, 9.5 parts of hyl (4-formylphenoxy)-2,2-dimethylacetate and 6.1 irts of p-chlorobenzyl cyanide are converted to ethyl [4-(2-cyano-2-p-chlorophenylethenyl)phenoxy]-2,2-methylacetate, melting at 79°–80°C. This compound is the following structural formula.

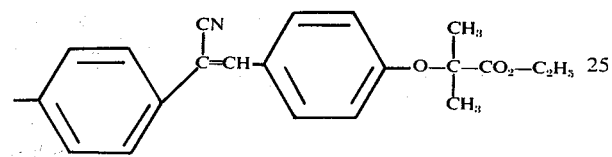

This ester is hydrolyzed in alcoholic potassium hyoxide and isolation provides 2-[4-(2-cyano-2-p-lorophenylethenyl)phenoxy]-2,2-dimethylacetic id, melting at 153°–154°C. This compound has the lowing structural formula

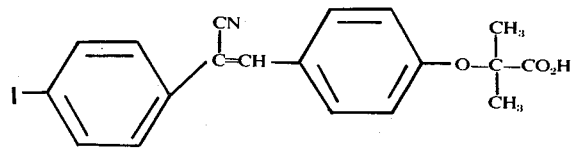

EXAMPLE 3

Following the procedures in Example 1, 9.7 parts of odophenylacetonitrile and 9.4 parts of ethyl (4-mylphenoxy)-2,2-dimethylacetate are converted to yl 2-[4-(2-cyano-2-p-iodophenylethenyl)phenoxy]-2-dimethylacetate, melting at 145°–147°C. This comund has the following structural formula

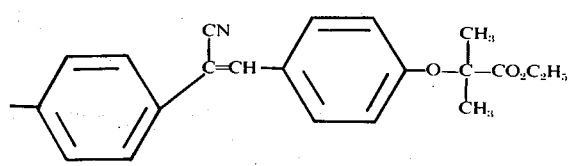

is ester is hydrolyzed in alcoholic potassium hydrox- and isolation provides 2-[4-(2-cyano-2-p-lophenylethenyl)phenoxy]-2,2-dimethylacetic acid, lting at 82°–83°C. This compound has the following uctural formula.

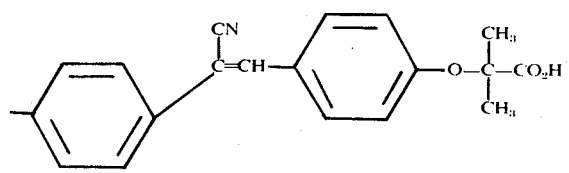

EXAMPLE 4

Following the procedure in Example 1, 7.4 parts of m-trifluoromethylphenylacetonitrile and 9.4 parts of ethyl (4-formylphenoxy)-2,2-dimethylacetate are converted to ethyl 2-[4-(2-cyano-2-m-trifluoromethylphenylethenyl)phenoxy09 -2,2-dimethylacetate, melting at 145°–147°C. This compound has the following structural formula

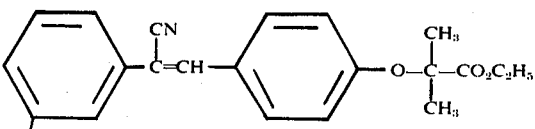

This ester is hydrolyzed in alcoholic potassium hydroxide and isolation provides 2-[4-(2-cyano-2-m-trifluoromethylphenylethenyl)phenoxy]-2,2-dimethylacetic acid, melting at 72°–73°C. This compound has the following structural formula.

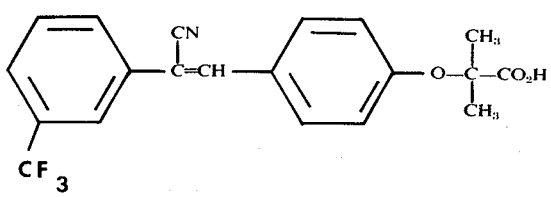

EXAMPLE 5

Following the procedure in Example 1, 5.9 parts of p-methoxyphenylacetonitrile and 9.5 parts of ethyl (4-formylphenoxy)2,2-dimethylacetate are converted to ethyl 2-[4-(2-cyano-2-p-methoxyphenylethenyl)phenoxy]-2,2-dimethylacetate, melting at 79°–80°C. This compound has the following chemical structure.

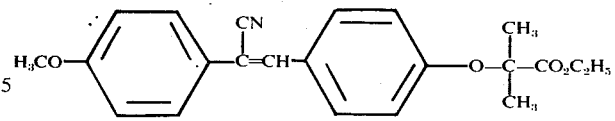

EXAMPLE 6

Following the procedure in Example 1, 5.4 parts of m-fluorophenylacetonitrile and 9.4 parts of ethyl (4-formylphenoxy)-2,2-dimethylacetate are converted to ethyl 2-[4-(2-cyano-2-m-fluorophenylethenyl)phenoxy]-2,2-dimethylacetate, melting at 85°–86°C. This compound has the following structural formula

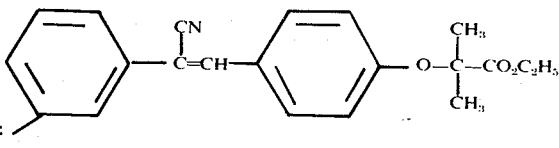

EXAMPLE 7

Following the procedure in Example 1, 9.8 parts of p-(2-ethoxycarbonyl-2-oxypropyl)phenylacetonitrile and 9.4 parts of ethyl (4-formylphenoxy)-2,2-dimethylacetate are converted to ethyl 2-(4-[2-cyano- 2-p-(2-ethoxycarbonyl-2-oxypropyl)phenylethenyl]phenoxy 2,2-dimethylacetate. This compound has the following structural formula.

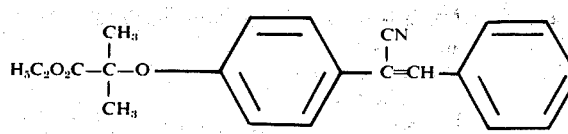
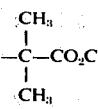

EXAMPLE 8

Following the procedures set out in Example 1, 6.2 parts of 3,4,5-trimethoxyphenylacetonitrile and 7.1 parts of ethyl (4-formylphenoxy)-2,2-dimethylacetate are converted to ethyl 2-[4-(2-cyano-2-3,4,5-trimethoxyphenylethenyl)phenoxy]-2,2-dimethylacetate. This compound is hydrolyzed in aqueous alcoholic potassium hydroxide to provide 2-[4-(2-cyano-2-3,4,5-trimethoxyphenylethenyl)phenoxy]-2,2-dimethylacetic acid, melting at 168°–169°C. This compound has the following chemical structure.

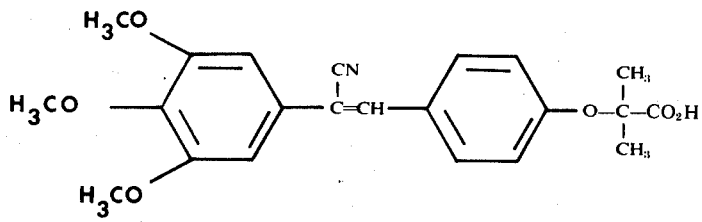

EXAMPLE 9

Following the procedures set out in Example 1, 5.0 parts of biphenylylacetonitrile and 5.9 parts of ethyl (4-formylphenoxy)-2,2-dimethylacetate are converted to ethyl 2-[4-(2-cyano-2-p-biphenylylethenyl)phenoxy]-2,2-dimethylacetate, melting at 130°–131°C. This compound has the following structural formula.

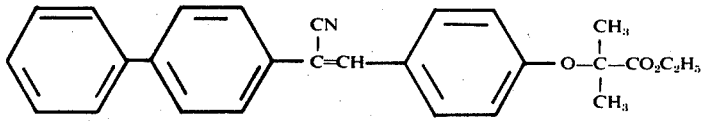

EXAMPLE 10

Following the procedure in Example 1, 9.5 parts of ethyl (4-formylphenoxy)-2,2-dimethylacetate and 6.1 parts of o-chlorobenzyl cyanide are converted to ethyl 2-[4-(2-cyano-2-o-chlorophenylethenyl)phenoxy]-2,2-dimethylacetate. This compound has the following structural formula

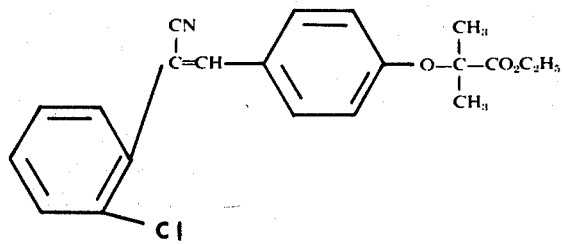

EXAMPLE 11

Following the procedures set out in Example 1, 6.2 parts of 3,4,5-triethoxyphenylacetonitrile and 7.1 parts of ethyl (4-formylphenoxy)-2,2-dimethylacetate are converted to ethyl 2-[4-(2-cyano-2-3,4,5-triethoxyphenylethenyl)phenoxy]-2,2-dimethylacetate. This compound is hydrolyzed in aqueous alcoholic potassium hydroxide to provide 2-[4-(2-cyano-2-3,4,5-triethoxyphenylethenyl)phenoxy]-2,2-dimethylacetic acid. This compound has the following chemical structure.

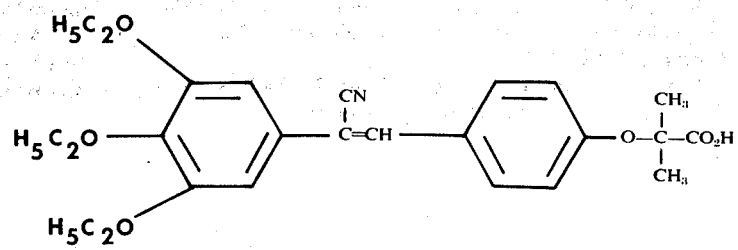
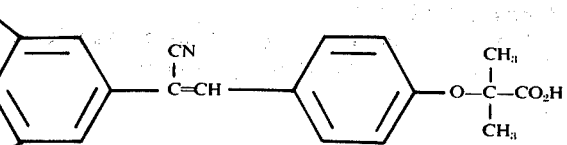

EXAMPLE 12

Following the procedure in Example 1, 5.9 parts of p-ethoxyphenylacetonitrile and 9.5 parts of methyl (4-formylphenoxy)-2,2-dimethylacetate are converted to methyl 2-[4-(2-cyano-2-p-ethoxyphenylethenyl)phenoxy]-2,2-dimethylacetate. This compound has the following chemical structure.

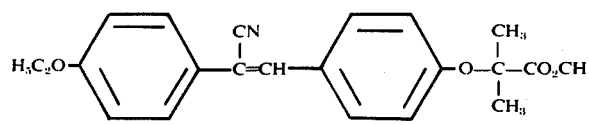

What is claimed is:
1. A compound of the formula

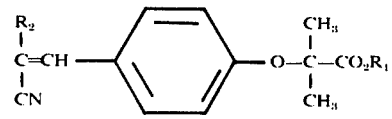

wherein $R_1$ is hydrogen or lower alkyl and $R_2$ is phenyl, halophenyl, trifluoromethylphenyl, p-[2-(lower alkoxy) carbonyl-2-oxypropyl]phenyl or 3,4,5-(tri-lower alkoxy)phenyl.

2. A compound according to claim 1 which is ethyl 2-[4-(2-cyano-2-phenylethenyl)phenoxy]-2,2-dimethylacetate.

3. A compound according to claim 1 which is ethyl 2-[4-(2-cyano-2-p-chlorophenylethenyl)phenoxy]-2,2-dimethylacetate.

4. A compound according to claim 1 which is ethyl 2-[4-(2-cyano-2-p-methoxyphenylethenyl)phenoxy]-2,2-dimethylacetate.

5. A compound according to claim 1, which is ethyl 2-[4-(2-cyano-2-m-fluorophenylethenyl)phenoxy]-2,2-dimethylacetate.

6. A compound according to claim 1 which is ethyl 2-[4-[2-cyano-2-p-(2-ethoxycarbonyl-2-oxypropyl)phenylethenyl]phenoxy)-2,2-dimethylacetate.

7. A compound according to claim 1 which is 2-[4-(2-cyano-2-p-chlorophenylethenyl)phenoxy]-2,2-dimethylacetic acid.

8. A compound according to claim 1 which is 2-[4-(2-cyano-2-p-iodophenylethenyl)phenoxy]-2,2-dimethyl acetic acid.

9. A compound according to claim 1 which is ethyl 2-[4-(2-cyano-2-p-iodophenylethenyl)phenoxy]-2,2-dimethylacetate.

10. A compound according to claim 1 which is 2-[4-(2-cyano-2-m-trifluoromethylphenylethenyl)phenoxy]-2,2-dimethylacetic acid.

11. A compound according to claim 1 which is ethyl 2-[4-(2-cyano-2-m-trifluoromethylphenylithenyl)phenoxy]-2,2-dimethylacetate.

12. A compound according to claim 1 which is 2- 4-[2-cyano-2-(3,4,5-trimethoxyphenyl)ethenyl]phenoxy -2,2-dimethylacetic acid.

13. A compound according to claim 1 which is ethyl 2-[4-(2-cyano-2-o-chlorophenylethenyl)phenoxy]-2,2-dimethylacetate.

14. A compound according to claim 1 which is ethyl 2-[4-(2-cyano-2-p-biphenylylethenyl)phenoxy]-2,2-dimethylacetate.

* * * * *